No. 700,550. Patented May 20, 1902.
G. OTTO & F. SCHAUB.
MUSIC BOX.
(Application filed Dec. 14, 1901.)
(No Model.)

WITNESSES:
F. Stallman
E. Oetjen

INVENTORS
G. Otto
F. Schaub
BY
their ATTORNEY

THE NORRIS PETERS CO., PHOTO-LITHO., WASHINGTON, D. C.

UNITED STATES PATENT OFFICE.

GUSTAV OTTO AND FERDINAND SCHAUB, OF JERSEY CITY, NEW JERSEY.

MUSIC-BOX.

SPECIFICATION forming part of Letters Patent No. 700,550, dated May 20, 1902.

Application filed December 14, 1901. Serial No. 85,990. (No model.)

*To all whom it may concern:*

Be it known that we, GUSTAV OTTO and FERDINAND SCHAUB, citizens of the United States, and residents of Jersey City, in the county of Hudson and State of New Jersey, have invented certain new and useful Improvements in Music-Boxes, of which the following is a specification.

This invention relates to improvements in music-boxes, especially to that class having steel combs.

The object of our invention is to provide a new and improved music-box of this kind which is simple in construction, not expensive, and produces a much louder sound than the ordinary construction of steel-comb music-boxes.

Figure 1:
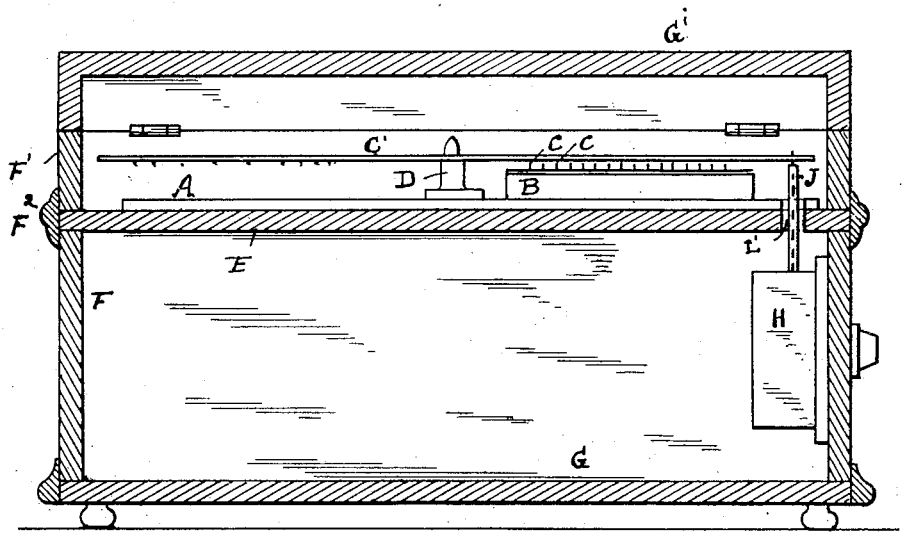
Figure 2:
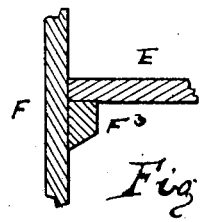
Figure 3:
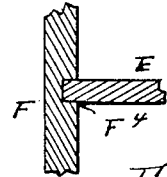

In the accompanying drawings, in which like letters of reference indicate like parts in all the figures, Figure 1 is a vertical longitudinal sectional view of our improved music-box. Figs. 2 and 3 are sectional views of parts, showing modifications.

The music-box has a metal base-plate A, on which are secured one or more combs B and picking devices C, which are to be operated by a disk C', placed on the center pin D. This base-plate is firmly secured to a sounding-board E, held firmly in the casing F.

As shown in Fig. 1, the sounding-board extends to the outer sides of the casing, and a section F' of the casing is built up above the board, and a molding F² covers and conceals the outer edges of the sounding-board E. As shown in Fig. 2, the sounding-board B is glued to internal brackets F³ of the casing F.

As shown in Fig. 3, the edges of the sounding-board are let into the grooves F⁴ of the casing F'. In all cases the board is to be firmly and rigidly attached to the casing F, which is provided with the usual bottom G and cover G'.

A motor H is bolted to a wall of the casing F and by means of suitable gearing drives a toothed wheel J, which can engage holes or teeth in the edge part of the note-disk C', and such driving-wheel and the gear for rotating it project through registering slots L' in the metal base-plate A and sounding-board E. The motor is not in any way attached either to the sounding-board or metal base-plate, but is supported wholly independent of such sounding-board and base-plate by the wall of the casing. As the metal base-plate is supported wholly by the sounding-board to which it is attached and is not in contact with any other part of the casing, the tone is augmented to a very great extent, especially as the sounding-board is not connected with any other mechanism and is free to vibrate throughout its entire area. At the same time the sounding-board is held securely at its edges to the walls of the casing.

Having described our invention, what we claim as new, and desire to secure by Letters Patent, is—

1. In a music-box, the combination with a casing, of a wood sounding-board secured at its edges to the casing, a metal base-plate secured directly on said sounding-board, a metallic comb on said base-plate, and means for picking the teeth of the comb, substantially as herein shown and described.

2. The combination with a casing, of a sounding-board secured at its edges to the casing, a metal base-plate secured directly on the sounding-board, a metallic comb on said base-plate, means for picking the teeth of the comb, and a note-disk-operating gear secured to the casing entirely independent of the sounding-board and base-plate, substantially as herein shown and described.

3. The combination with a casing, of a wood sounding-board secured at its edges to the casing, a metal base-plate secured directly on the sounding-board, a metallic comb on said base-plate, means for picking the teeth of the comb, a motor secured to the casing entirely independent of the sounding-board and base-plate, a disk-rotating gear operated from said motor, the base-plate and sounding-board having slots through which said driving-gear extends, substantially as herein shown and described.

Signed at Jersey City, in the county of Hudson and State of New Jersey, this 14th day of November, A. D. 1901.

GUSTAV OTTO.
FERDINAND SCHAUB.

Witnesses:
OTTO J. MEYER,
CHAS. CLOUBERG.